United States Patent [19]
Johnson

[11] 3,972,601
[45] Aug. 3, 1976

[54] PERIPHERAL VISION NON-DISTORTING REAR VIEW MIRROR

[76] Inventor: William Johnson, 8912 Nightingale Ave., Fountain Valley, Calif. 92708

[22] Filed: Aug. 19, 1974

[21] Appl. No.: 498,864

[52] U.S. Cl. ............................ 350/303; 350/299; D12/187
[51] Int. Cl.² ......................................... G02B 5/08
[58] Field of Search ........... 350/303, 288, 289, 292, 350/296, 299, 301, 307, 97, 91, 100, 103, 106, 109; D12/187, 188, 189; D86/10 H; D45/1 A; 63/32

[56] References Cited
UNITED STATES PATENTS

| | | | |
|---|---|---|---|
| 2,009,390 | 7/1935 | Bayardi | D45/1 A |
| 2,279,751 | 4/1942 | Hensley | 350/303 |
| 2,778,273 | 1/1957 | Fellmeth | 350/303 |
| 2,907,187 | 10/1959 | Karp et al. | 63/32 |
| 3,021,756 | 2/1962 | Milton et al. | 350/304 |
| 3,263,561 | 8/1966 | Jackson | 350/293 |
| 3,411,843 | 11/1968 | Moller | 350/303 |
| 3,806,232 | 4/1974 | Gray | 350/303 |
| 3,867,013 | 2/1975 | Ashenfarb | 350/299 |
| D47,703 | 8/1915 | Shepard | 63/32 X |
| D231,520 | 4/1974 | Harrison | D86/10 H |

*Primary Examiner*—John K. Corbin
*Assistant Examiner*—Jon W. Henry
*Attorney, Agent, or Firm*—Edward E. Roberts

[57] ABSTRACT

An optical configuration suitable for use as a rear view mirror for motor vehicles, the configuration including a plurality of distortion-free plane reflecting mirror surfaces oriented to provide a complete peripheral view without distortion.

7 Claims, 7 Drawing Figures

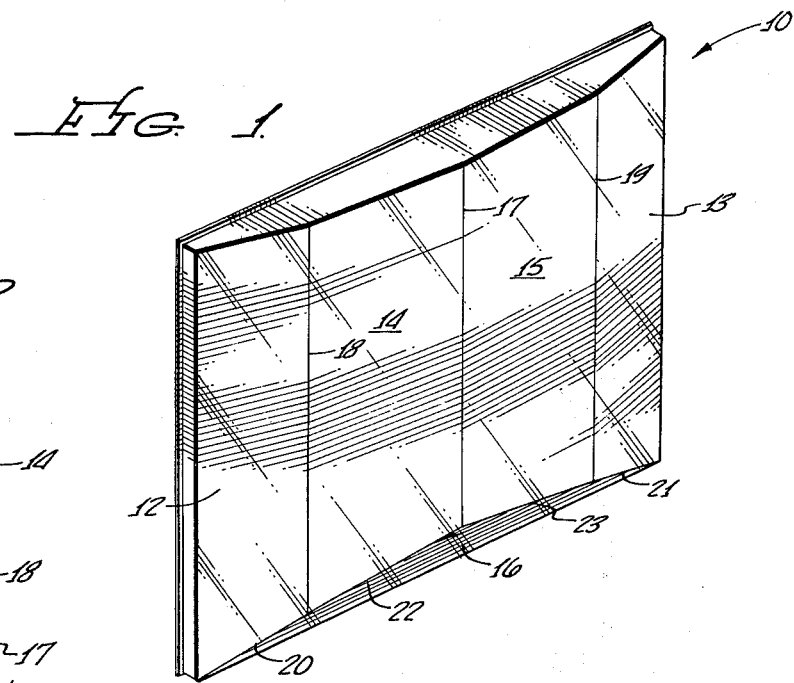
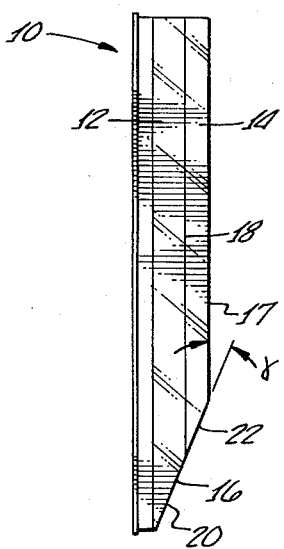
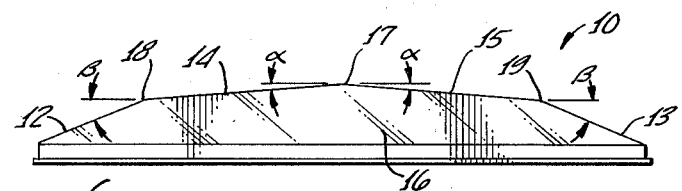
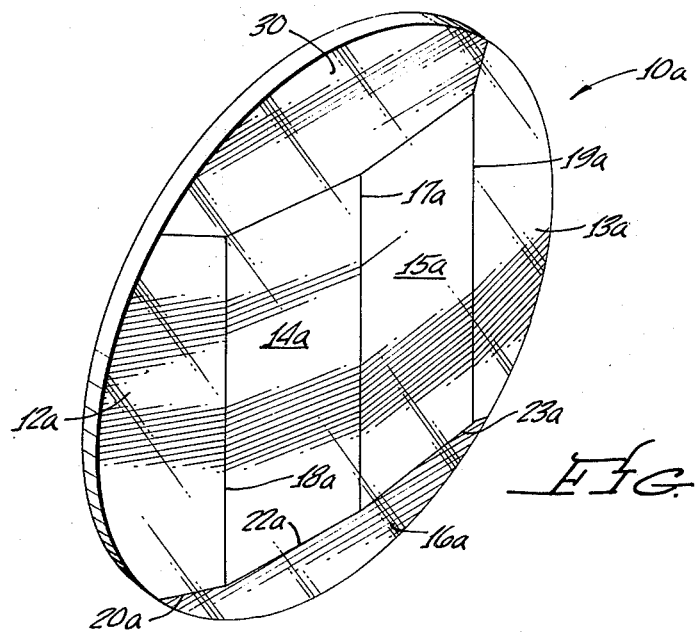

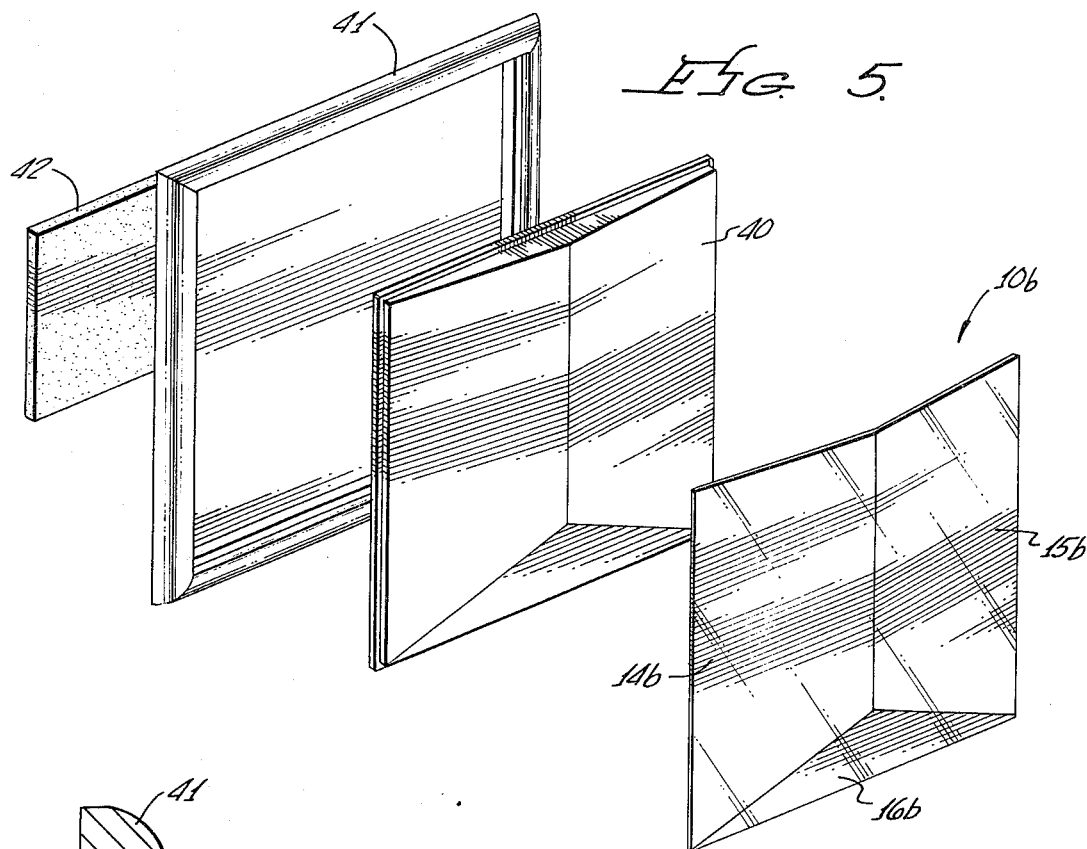
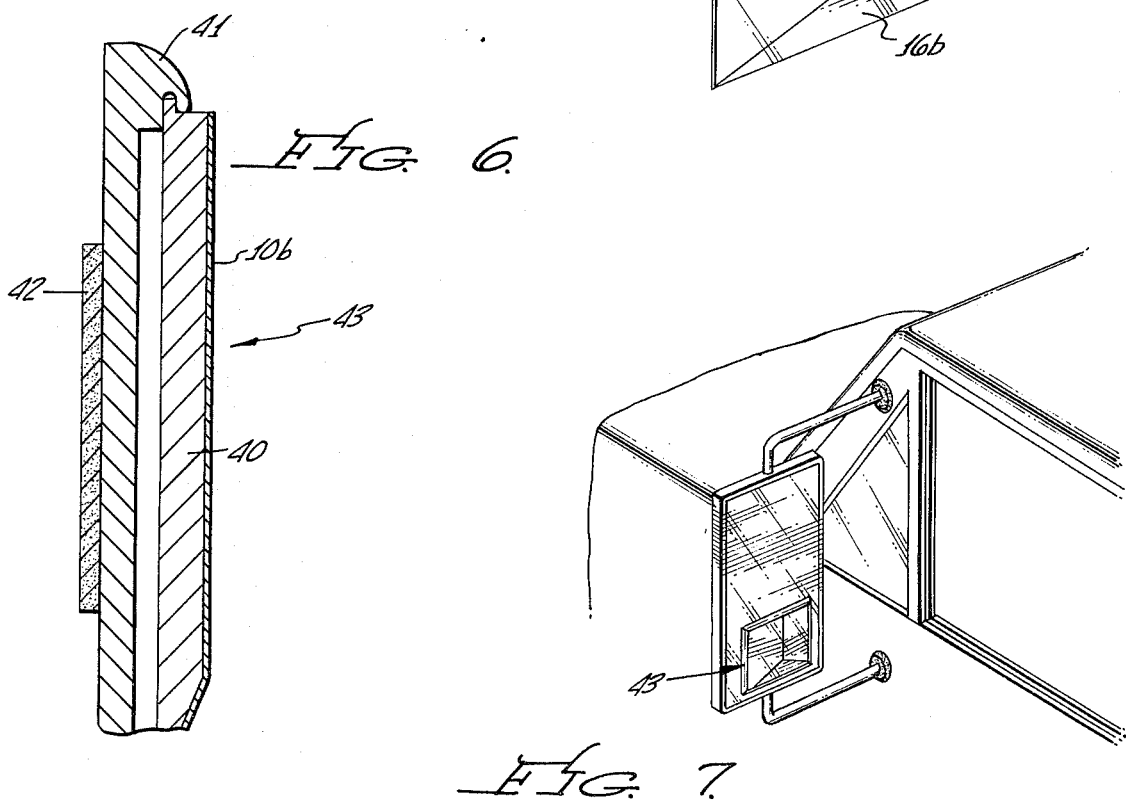

PERIPHERAL VISION NON-DISTORTING REAR VIEW MIRROR

BACKGROUND OF THE INVENTION

1. Field of the Invention

The invention relates to a mirror configuration adapted for motor vehicles to provide a peripheral field of vision to the rear without distance or object distortion.

2. Prior Art

It has long been recognized that conventional mirrors for a motor vehicle have been inadequate in providing rear view visibility in that hazardous blind spots continue to exist, in particularly to the left and right rear of the motor vehicle.

Various kinds of side mirrors have been mounted on the exterior of the motor vehicle in an effort to eliminate or minimize these blind spots. Some of these have been extra wide or elongated conventional mirrors, some have been curved mirrors, and some have been combinations; however, prior art mirrors, both exterior and interior mounted, have failed to provide complete distortion-free peripheral vision. The device of this invention corrects prior art deficiencies by an assembly of plane mirrors optimumly arranged relative to each other whereby complete distortion-free peripheral vision is provided.

SUMMARY OF THE INVENTION

An outside rear vision safety mirror employing distortion-free plane mirror surfaces and adapted for use with a motor vehicle is provided. The mirror surfaces are arranged with first and second mirror surfaces adjoining each other at a center line and sloping rearwardly from the center line, a third mirror surface adjoining said first mirror surface and sloping rearwardly therefrom, a fourth mirror surface adjoining said second mirror surface and sloping rearwardly therefrom, and a fifth mirror surface adjoining said first, second, third and fourth mirror surfaces and sloping downwardly and rearwardly therefrom. The mirror assembly provides complete peripheral non-distorted vision to the rear of a motor vehicle while requiring attention to only one area.

BRIEF DESCRIPTION OF THE DRAWINGS

FIG. 1 is a front elevational view of the mirror in accordance with an embodiment of the invention.

FIG. 2 is a bottom view of the mirror of FIG. 1.

FIG. 3 is a side elevational view of the mirror of FIG. 1.

FIG. 4 is a front elevational view of a round mirror arrangement accordance with another embodiment of the invention.

FIG. 5 is an exploded view illustrating a mounting assembly for the mirror of the invention.

FIG. 6 illustrates the mounted mirror in accordance with the mounting assembly of FIG. 5.

FIG. 7 is a fragmentary view illustrating the mounting on a motor vehicle of the mirror.

DETAILED DESCRIPTION

Referring to FIG. 1, mirror device 10 illustrates an embodiment in accordance with the invention. Mirror device 10 includes five mirror surfaces 12, 13, 14, 15 and 16, each of which mirror surfaces is a distortion-free plane mirror. With FIG. 1 presenting the vertical orientation in which the mirror would be mounted when in use, center mirror surfaces 14 and 15 are seen to slope rearwardly from the center ridge line 17 to thus provide combined direct rearward vision and side vision. In one embodiment of the invention, with clarity provided by FIG. 2, surfaces 14 and 15 slope rearwardly from ridge 17 at an angle $\alpha$, which angle typically approximates 2° to 3°.

Side mirror surfaces 12 and 13 slope rearwardly from surfaces 14 and 15 respectively, starting at demarcation lines 18 and 19 respectively, at an angle $\beta$, which angle typically approximates 3° to 4°. Mirror surfaces 12 and 13 thus also provide combined direct rearward and side vision; however, they provide more side vision than do surfaces 14 and 15.

Bottom mirror surface 16, more clearly shown in FIG. 3, is inclined rearwardly and downwardly at an angle $\gamma$ from the vertical, which angle typically approximates 2° to 3°. Mirror surface 16 provides combined rearward and downward vision.

Bottom mirror surface 16 intersects mirror surfaces 12, 13, 14 and 15 at demarcation lines 20, 21, 22 and 23 respectively. In an embodiment of the invention the center mirrors 14 and 15 are typically 1.5 inches wide and the side mirrors 12 and 13 typically 0.5 inches wide. Mirror surface 16 is typically 1.0 inch wide as measured from the bottom end point of ridge 17 down to the bottom of the mirror surface 16. With the above angles and dimensions, the mirror 10 would be approximately 3.0 inches wide.

While satisfactory results are obtained with the angles approximately as specified, it is to be understood that variations may be made in the above angles and dimensions without exceeding the scope and spirit of the invention.

FIG. 4 illustrates another embodiment of applicant's invention wherein mirror surfaces and demarcation lines corresponding to those shown in FIGS. 1, 2 and 3 are designated with the letter a. For example, ridge line 17a of FIG. 4 corresponds to ridge line 17 of FIGS. 1, 2 and 3. The angles interrelating mirror surfaces 12a, 14a, 15a, 13a and 16a are the same as those specified for the angles interrelating surfaces 12, 14, 15, 13 and 16 ($\alpha$, $\beta$, and $\gamma$). Thus, mirror device 10a of FIG. 4 is essentially the same as mirror device 10 of FIGS. 1, 2 and 3 except it is constructed on a circular base. Mirror 10a would also provide combined rearward and upward vision with mirror surface 30 which can be inclined rearwardly and upwardly at the angle $\gamma$ or another suitable angle.

FIG. 5 illustrates as yet another embodiment of applicant's invention wherein certain mirror surfaces and demarcation lines are similar to those shown in FIGS. 1, 2, 3 and 4. In this embodiment, mirror 10b includes three distortion-free plane mirror surfaces 14b, 15b and 16b. With FIG. 5 presenting the vertical orientation in which the mirror would be mounted when in use, mirror surfaces 14b and 15b are seen to slope rearwardly from the center ridge line 17b to thus provide combined rearward vision and side vision. Bottom mirror surface 16b is inclined rearwardly and downwardly to provide combined rearward and downward vision. Satisfactory results are obtained with mirror surfaces 14b and 15b sloping rearwardly typically at approximately 2° to 4° and mirror surface 16b sloping rearwardly at typically 3° to 5°. The mirror of this embodiment may typically be approximately 3.0 inches wide and 2.5 inches high. It is understood that variations may be made in these angles and dimensions without exceeding the scope and spirit of the invention.

Applicant's mirror may be fabricated and assembled as shown in the exploded view of FIG. 5, the desired embodiment of the mirror first being bonded to holding case 40 with a suitable adhesive. The combined holding case 40 and mirror is next fitted into mounting 41 as more clearly shown in FIG. 6. A double face tape 42 may then be applied to the opposite side of the mounting 41 providing means for attachment of the assembled unit 43 where desired, for instance, the mirror of the invention can be mounted to a motor vehicle in a conventional manner as shown in FIG. 7.

It may be seen, therefore, that by this invention, complete rear vision is afforded by distortion-free plane mirrors arranged such that the driver is required to observe only one area to detect exact conditions to the rear of his car.

The foregoing detailed description is to be clearly understood as given by way of illustration and example only and not limitative of the invention, the spirit and scope of the invention being limited solely by the appended claims.

Having thus described the preferred embodiments of the invention, what is claimed is:

1. A mirror having at least first and second opposite sides for providing complete peripheral non-distorted vision to said first side, comprising:
   first and second plane mirror surfaces on said first side having at least first and second opposite edges, the first edges of said first and second plane mirror surfaces adjoining each other at a center line having first and second ends along said first edges, said first and second mirror surfaces sloping from said center line toward said second side at an angle of 2° to 3°;
   a third plane mirror surface on said first side adjoining said first mirror surface at the second edge thereof and sloping toward said second side at an angle of 3° to 4°; and
   a fourth plane mirror surface on said first side adjoining said second mirror surface at the second edge thereof and sloping toward said second side at an angle of 3° to 4°.

2. The mirror of claim 1 further comprising:
a fifth plane mirror surface on said first side adjoining said first, second, third and fourth mirror surfaces at third edges thereof and intersecting the first end of the center line and sloping toward said second side.

3. The mirror of claim 2 further comprising:
a sixth plane mirror surface on said first side adjoining said first, second, third and fourth mirror surfaces at fourth edges thereof and intersecting the second end of the center line and sloping toward said second side.

4. The mirror of claim 2 wherein:
said first and second mirror surfaces are approximately 1.5 inches wide;
said third and fourth mirror surfaces are approximately 0.5 inches wide, and
said fifth mirror surface is approximately 1.0 inches wide measured from the first end point of said center line along the direction of slope.

5. The mirror of claim 3 wherein:
said fifth mirror surface slopes toward said second side at an angle of 2.0° to 3°. and
said sixth mirror surface slopes toward said second side at an angle of 2.0° to 3.0°.

6. In combination:
a mirror having first and second, opposite sides and having at least five plane mirror surfaces on said first side inclined one to the other;
holding means for receiving said mirror;
mounting means for mounting said holding means and said mirror to provide vision to said first side;
the first and second mirror surfaces adjoining each other to form a first common edge having first and second ends;
the third mirror surface adjoining said first mirror surface along a second common edge having first and second ends, said second common edge being substantially parallel to said first common edge;
the fourth mirror surface adjoining said second mirror surface along a third common edge having first and second ends, said third common edge being substantially parallel to said first common edge; and
the fifth mirror surface adjoining said first, second third and fourth mirror surfaces at the first ends of the respective common edges thereof.

7. The combination recited in claim 6 further comprising a sixth mirror surface adjoining said first, second, third and fourth mirror surfaces at the second ends of the respective common edges thereof.

* * * * *